(12) United States Patent
Yoo

(10) Patent No.: US 8,884,556 B2
(45) Date of Patent: Nov. 11, 2014

(54) SYSTEM FOR CONTROLLING A MOTOR OF VEHICLE

(75) Inventor: Taeil Yoo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 591 days.

(21) Appl. No.: 13/185,720

(22) Filed: Jul. 19, 2011

(65) Prior Publication Data

US 2012/0139458 A1    Jun. 7, 2012

(30) Foreign Application Priority Data

Dec. 7, 2010  (KR) .................. 10-2010-0124165

(51) Int. Cl.
   *H02P 1/00*           (2006.01)
(52) U.S. Cl.
   USPC ..................... 318/139; 318/400.02
(58) Field of Classification Search
   USPC ............ 318/139, 799, 800, 802, 400.02, 432, 318/434
   See application file for complete search history.

(56) References Cited

U.S. PATENT DOCUMENTS

| | | | | |
|---|---|---|---|---|
| 5,780,980 A | * | 7/1998 | Naito | 318/139 |
| 6,236,172 B1 | * | 5/2001 | Obara et al. | 318/139 |
| 6,639,379 B2 | * | 10/2003 | Matsushita et al. | 318/727 |
| 7,667,426 B2 | * | 2/2010 | Jeong et al. | 318/700 |
| 2010/0090629 A1 | * | 4/2010 | Tang | 318/400.09 |

FOREIGN PATENT DOCUMENTS

| | | |
|---|---|---|
| JP | 07107772 A | 4/1995 |
| JP | 2009143263 A | 7/2009 |
| KR | 10-0957330 | 6/2009 |
| KR | 10-0921096 | 9/2009 |

* cited by examiner

*Primary Examiner* — Rina Duda
(74) *Attorney, Agent, or Firm* — Edwards Wildman Palmer LLP; Peter F. Corless

(57) ABSTRACT

A system for controlling a motor of a vehicle that improves fuel economy by minimizing a sum of heat generated by the motor and heat generated by a converter, is disclosed. More specifically, a power source supplies DC electricity; a converter selectively receives and converts the DC electricity of the power source into inverter input voltage. A relay module selectively connects the power source to the converter and an inverter module receives the inverter input voltage from the converter, converts the inverter input voltage into 3-phase AC current, and supplies the 3-phase AC current to the motor. Further, a controller controls operations of the converter, the relay module, and the inverter module, to perform to minimize the inverter input voltage that is a sum of heat generated due to the flux-weakening control and heat generated due to suppression of the flux-weakening control.

12 Claims, 7 Drawing Sheets

SYSTEM FOR CONTROLLING A MOTOR OF VEHICLE

CROSS-REFERENCE TO RELATED APPLICATION

This application claims priority to and the benefit of Korean Patent Application No. 10-2010-0124165 filed in the Korean Intellectual Property Office on Dec. 7, 2010, the entire contents of which are incorporated herein by reference.

BACKGROUND OF THE INVENTION (a) Field of the Invention

The present invention relates to a system for controlling a motor of a vehicle. More particularly, the present invention relates to a system for controlling a motor of a vehicle that improves fuel economy by minimizing a sum of heat generated by the motor and heat generated by a converter.

(b) Description of the Related Art

Recently, environmentally-friendly vehicles such as hybrid vehicles and electric vehicles have attracted increasing attention due to energy depletion and environmental pollution. The environmentally-friendly vehicles typically include a motor that generates a driving torque by using electricity from a battery, and a permanent magnet synchronous motor is mainly used as the motor.

A permanent magnet synchronous motor (PMSM) has high power/high efficiency characteristics and is widely used in industrial applications. The PMSM has broadened its use to a drive motor of the environmentally-friendly vehicle.

Because an engine can be controlled regardless of the amount fuel amount remaining in a fuel tank (gasoline and diesel engines widely used as driving devices of conventional vehicles), the fuel amount remaining in the fuel tank does not operate directly as a control variable for controlling the engine. In addition, because a permanent magnet synchronous motor using commercial electricity as an input power uses the commercial electricity supplied from a sub-station, an input voltage is very stable. Therefore, a change in the input voltage does not affect control of a controller and speed or torque of the permanent magnet synchronous motor greatly when driving the permanent magnet synchronous motor.

However, the permanent magnet synchronous motors receive input voltage mainly from a power supplying device (e.g., battery) mounted in the vehicle. Because the power supplying device mounted in the vehicle has a limited size and capacity, an output voltage changes according to charging state thereof. Accordingly, the charging state of the power supplying device affects a controller of the permanent magnet synchronous motor directly, and changes control state of the motor as a result. Change in the input voltage applied to the controller directly affects current and voltage applied to an inverting module in an inverter and an electric coil of the permanent magnet synchronous motor, and thereby changes heat generation in accordance therewith. Therefore, heat that is greater than the required heat generation may be generated in the permanent magnet synchronous motor.

An increase in heat generated at the motor and the controller in the vehicle using the permanent magnet synchronous motor as power source works on cooling burden and causes the fuel economy of the vehicle to be reduced. Therefore, it is very important to minimize heat generation in a motor control system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for controlling a motor of a vehicle having advantages of minimizing heat generated at a motor and a controller that controls the motor used in an environmentally-friendly vehicle as power source.

A system for controlling a motor of a vehicle according to an exemplary embodiment of the present invention may include: a power source configured to supply DC electricity; a converter selectively configured to receive and convert the DC electricity of the power source into inverter input voltage; a relay module configured to selectively connect the power source to the converter; an inverter module configured to receive the inverter input voltage from the converter, convert the inverter input voltage into 3-phase AC current, and supply the 3-phase AC current to the motor; and a controller configured to control operations of the converter, the relay module, and the inverter module, More specifically, the controller performs a minimum heat-generation control such that the inverter input voltage that minimizes the sum of heat generated due to a flux-weakening control and heat generated due to suppression of the flux-weakening control by the converter is input to the inverter module.

The inverter input voltage may be calculated from a first characteristic value relating to currents of the first and second axes and a second characteristic value relating to voltage-converting characteristics of the converter. The minimum heat-generation control may not be performed when a maximum voltage or a minimum voltage is to be secured, the motor is controlled to be operated with a maximum torque, or a state of charge (SOC) is to be secured.

A system for controlling a motor of a vehicle according to another exemplary embodiment of the present invention may include a converter configured to convert DC electricity of a power source into inverter input voltage, an inverter module configured convert the inverter input voltage of the converter into 3-phase AC current and supply the AC current to the motor, and a controller configured to control operations of the converter and the inverter module, wherein the controller performs flux-weakening control when flux having a direction opposite to a direction of flux generated by the motor is generated, and suppresses the flux-weakening control so as to reduce heat generated by the flux-weakening control. More specifically, the controller performs a minimum heat-generation control such that the inverter input voltage that makes a sum of heat generated due to the flux-weakening control and heat generated due to suppression of the flux-weakening control be minimized is input to the inverter module.

The inverter input voltage may be calculated from a first characteristic value relating to currents of the first and second axes and a second characteristic value relating to voltage-converting characteristics of the converter. The minimum heat-generation control may not be performed when a maximum voltage or a minimum voltage is to be secured, the motor is controlled to be operated with a maximum torque, or a state of charge (SOC) is to be secured.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

Figure 1:
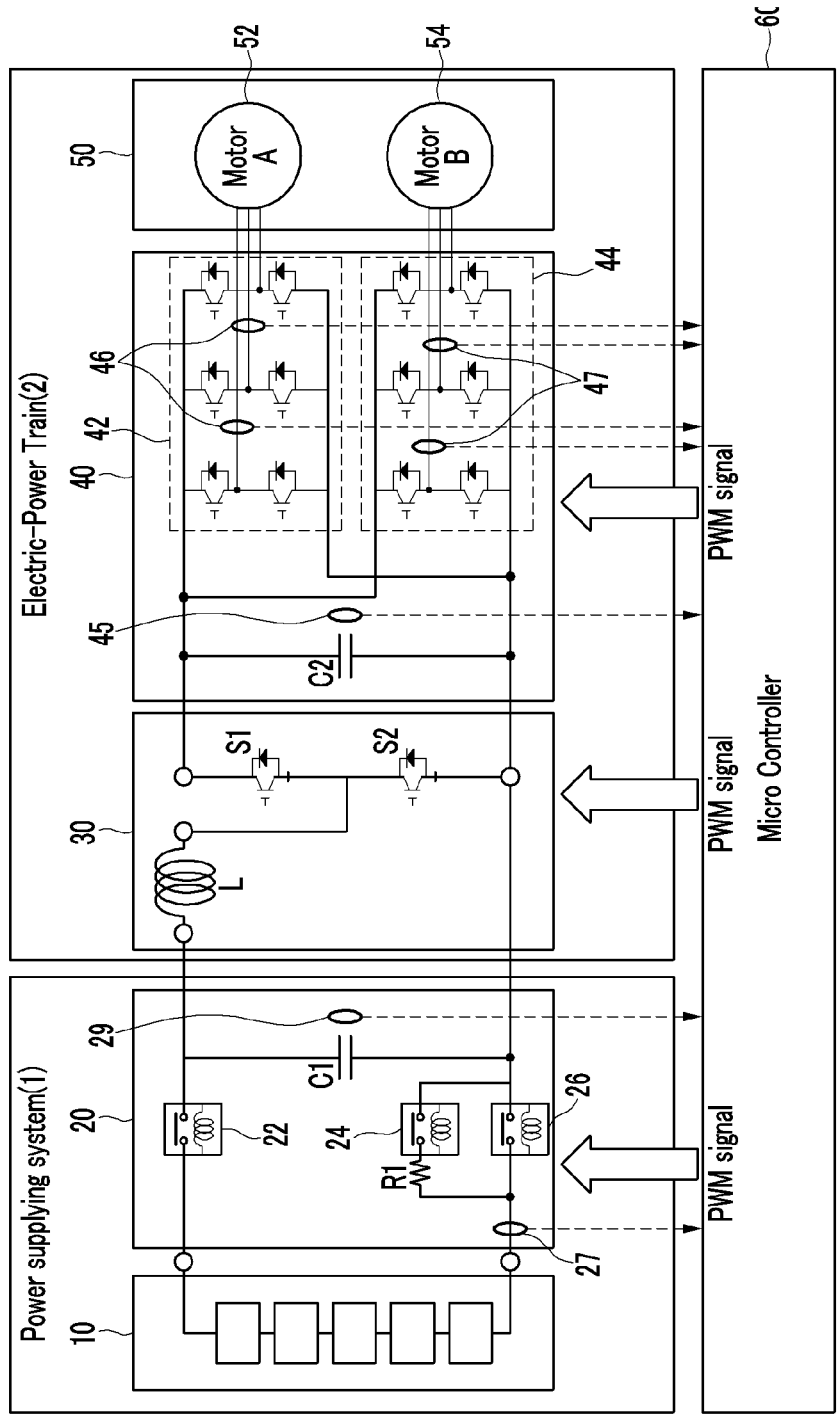
FIG. 1 is a schematic diagram of a system for controlling a motor of a vehicle according to an exemplary embodiment of the present invention.

FIG. 1 is a schematic diagram of a system for controlling a motor of a vehicle according to an exemplary embodiment of the present invention.

As shown in FIG. 1, a system for controlling a motor of a vehicle according to an exemplary embodiment of the present invention includes a power source 10, a relay module 20, a converter 30, an inverter module 40, a motor portion 50, and a controller 60. The power source 10 includes a plurality of power supplying units coupled in series and selectively supplies DC voltage V1 to the converter 30. A battery is mainly used as the power source 10.

The relay module 20 selectively connects the power source 10 to the converter 30. The relay module 20 includes first, second, and third relays 22, 24, and 26, a resistance R1, and a first capacitor C1. If the first relay 22 and the third relay 26 are switched on, a voltage being the same as the DC voltage of the power source 10 is charged at the first capacitor C1. If the first relay 22 and the second relay 26 are switched on, the voltage drops by the resistance R1 coupled in series to the second relay 26. Therefore, the voltage being lower than the DC voltage of the power source 10 is charged at the first capacitor C1. In addition, a first ammeter 27 is configured to detect the current of the power source 10 and a first voltmeter 29 configured to detect the voltage charged at the first capacitor C1, are mounted at the relay module 20. The first ammeter 27 and the first voltmeter 29 are electrically connected to the controller 60 so as to deliver signals corresponding to the current of the power source 10 and the voltage charged at the first capacitor C1 to the controller 60. The controller 60 controls operations of the first, second, and third relays 22, 24, and 26 based on the signals delivered from the first ammeter 27 and the first voltmeter 29.

The converter 30 converts the DC voltage received from the power source 10 into an inverter input voltage V2. The converter 30 includes a coil L and first and second switching elements S1 and S2. The controller 60 calculates the voltage that should be applied to the inverter module 40, and controls the first and second switching elements S1 and S2 based on the voltage.

The inverter module 40 receives the inverter input voltage from the converter 30 and converts the inverter input voltage into 3-phase AC current so as to supply the 3-phase AC current to the motor portion 50. The inverter module 40 includes a second capacitor 45 and first and second inverters 42 and 44. In this specification, a vehicle using the first and second motor 52 and 54 is exemplarily described, but is not limited to this. The number of the inverters is determined according to that of the number and type of motors that it is being applied to.

In addition, the inverter module 40 includes a second voltmeter 45 configured to detect a voltage charged at the second capacitor 45 and second and third ammeters 46 and 47 respectively configured to detect current supplied to the first and second motors 52 and 54. The second voltmeter 45 and the second and third ammeters 46 and 47 are electrically connected to the controller 60 so as to deliver signals corresponding to the voltage charged at the second capacitor 45 and the current supplied to the first and second motors 52 and 54 to the controller 60. The controller 60 controls operations of the first and second inverters 42 and 44 based on the signals received from the second voltmeter 45 and the second and third ammeters 46 and 47. The motor portion 50 includes the first and second motors 52 and 54.

Figure 2:
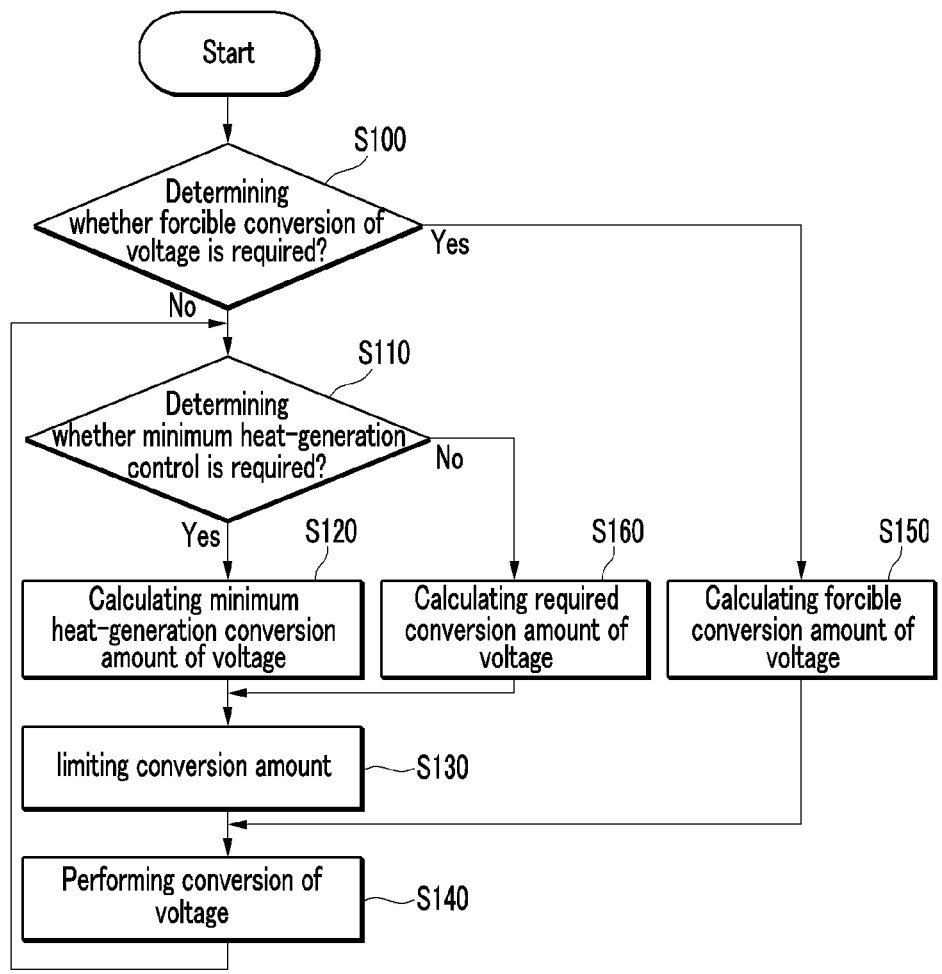
FIG. 2 is a flowchart of a method for controlling a motor by using a system for controlling a motor of a vehicle according to an exemplary embodiment of the present invention.

FIG. 2 is a flowchart of a method for controlling a motor by using a system for controlling a motor of a vehicle according to an exemplary embodiment of the present invention.

When a motor control apparatus begins control of the motor, the controller 60 determines whether the voltage needs to be converted forcibly at a step S100 as shown in FIG. 2. It is necessary to convert the voltage forcibly when a maximum voltage is required so as to convert a driving mode of the vehicle or when the converter 30 is not working. Accordingly, a minimum voltage should be converted. At this time, the inverter input voltage is predetermined.

If the voltage needs to be converted forcibly at the step S100, the controller 60 calculates a forcible conversion amount/value of the voltage according to the predetermined inverter input voltage at a step S150. After that, the controller 60 controls the converter 30 to convert the voltage at a step S140. If the voltage does not need to be converted forcibly at the step S100, the controller 60 determines whether minimum heat-generation control is required at a step S110. The system may be configured to have predetermined when the minimum heat-generation control is not required and when it is required. For example, it is not necessary to perform the minimum heat-generation control when the vehicle is running at a maximum torque or when a state of charge (SOC) of the power source 10 should be conserved.

If the minimum heat-generation control is not required at the step S110, the controller 60 calculates a required conversion amount of voltage at a step S160. The required conversion amount of voltage means a conversion amount of voltage that is required for the first and second motors 52 and 54 to be operated on a maximum torque per ampere (MTPA) line, and is calculated from a following equation.

$$\left(\frac{V_{system}}{w*L_{qs}}\right)^2 \le i_{qs}^{r2} + \left(\frac{L_{ds}}{L_{qs}}\right)^2 * \left(i_{ds}^r + \frac{\lambda_f}{L_{ds}}\right)^2$$

$$I_{smax}^2 \le I_{ds}^2 + I_{qs}^2$$

Herein, $V_{system}$ denotes a voltage of the system, w denotes a motor speed, $L_{qs}$ denotes a synchronized q-axis inductance, $L_{ds}$ denotes a synchronized d-axis inductance, $i_{qs}^r$ denotes a synchronized q-axis current, $i_{ds}^r$ denotes a synchronized d-axis current, and $\lambda_f$ denotes magnetic flux. In addition, $I_{s\,max}$ denotes a maximum current, $I_{ds}$ denotes d-axis current, and $L_{qs}$ denotes q-axis current.

After that, the controller 60 limits the required conversion amount of voltage based on the current voltage charged at the power source 10 at a step S130, and performs the conversion of the voltage at the step S140. If the minimum heat-generation control is required at the step S110, the controller 60 calculates minimum heat-generation conversion amount of voltage at a step S120. Processes for calculating the minimum heat-generation conversion amount of voltage will be described with reference to FIG. 3 to FIG. 7.

A maximum torque per current generated by the motor is limited due to a counter electromotive force generated when the motor rotates at a high speed. When the motor runs at such a high-speed region, flux-weakening control that generates flux having an opposite direction of flux generated by a rotor at a stator coil of the permanent magnet synchronous motor is generally performed so as to obtain a target torque.

Figure 3:
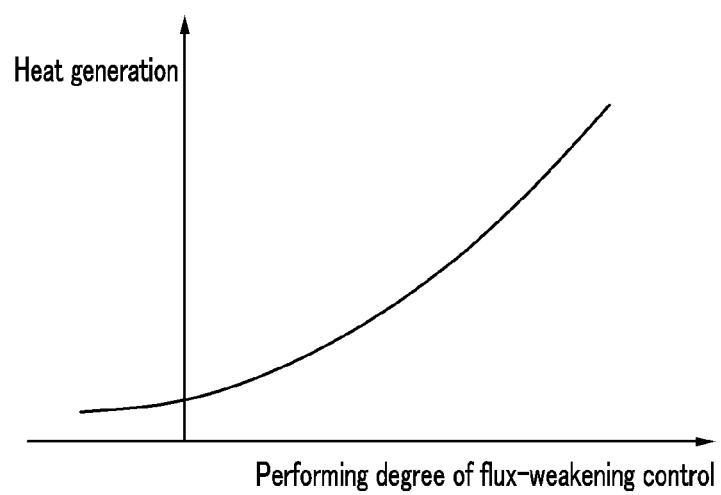
FIG. 3 is a graph showing heat generation according to performing degree of flux-weakening control.

As the motor rotates at the high speed, the degree of the flux-weakening control performed increases. When the flux-weakening control is performed, an additional current for the flux-weakening control should be applied other than the current for generating the torque. This increases the current of the inverter module and the motor compared to a case when the flux-weakening control is not performed. Therefore, the high current is applied to the inverter module and the motor such that additional heat is generated. FIG. 3 is a graph showing heat generation according to the degree of flux-weakening control performed.

Figure 4:
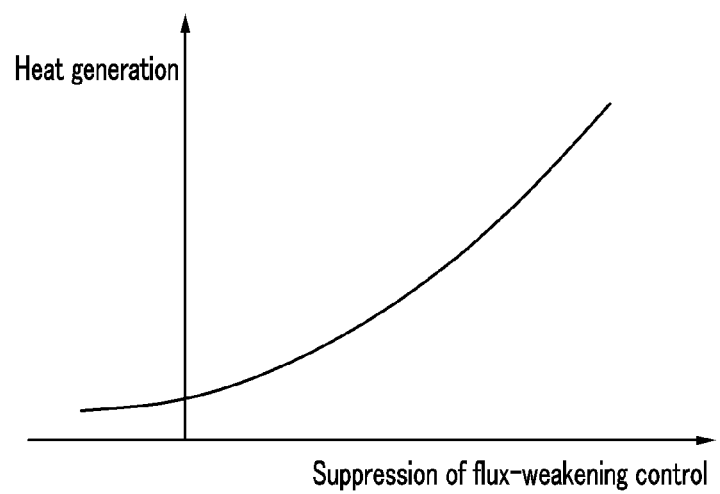
FIG. 4 is a graph showing heat generation according to suppression of flux-weakening control.

In order to reduce the degree of the flux-weakening control performed due to high-speed rotation of the motor and the heat generated thereby, and to prevent reduction of the torque due to the counter electromotive force, the high voltage is applied to the inverter module through the converter. In this case, the flux-weakening control is suppressed so as to reduce the heat generated at the motor and the inverter module. If the voltage is equal to or higher than the counter electromotive force, however, is additionally applied to the inverter module through the converter, the heat generated at the converter increases. FIG. 4 is a graph showing heat generation according to suppression of flux-weakening control.

Figure 5:
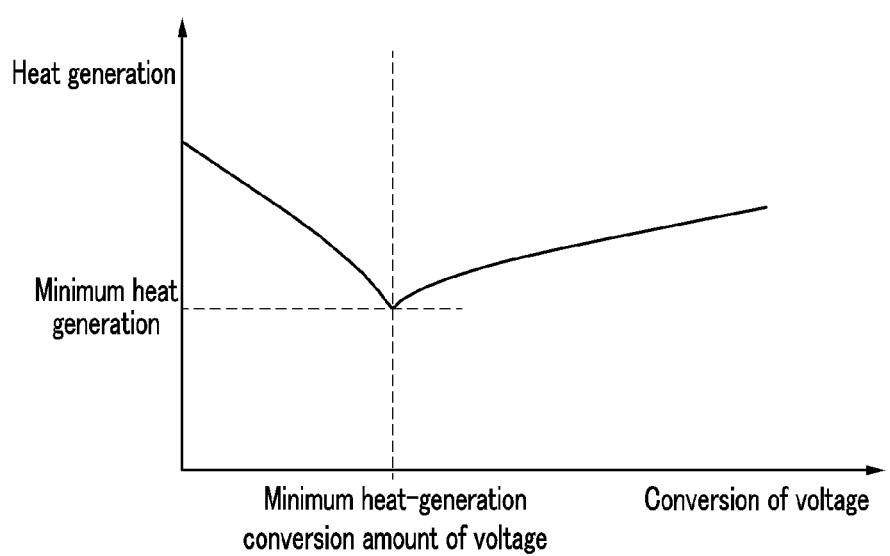
FIG. 5 is graph showing heat generation according to conversion of voltage.

According to an exemplary embodiment of the present invention, the inverter input voltage that can minimize the sum of the heat generation due to the flux-weakening control and the heat generation due to suppression of the flux-weakening control suppress is calculated. FIG. 5 is graph showing heat generation according to conversion of voltage. That is, as shown in FIG. 5, the inverter input voltage V2 at which the heat generation due to conversion of voltage minimized is calculated. A minimum heat-generation conversion amount of voltage (i.e., the inverter input voltage V2) is calculated from following equations.

$$\Delta V_{Rq}^* = w \times (\alpha * \Phi_{f1} + \beta * \Phi_{f2}) - V1$$

$$V2 = V1 + \Delta V_{Rq}^*$$

$$\Phi_{f1} = \sqrt{\lambda_f^2 + L_q^2 \times (I_{ds}^2 + I_{qs}^2)}$$

$$\Phi_{f2} = \text{Max}\left(\theta 1, \frac{\theta 2^b}{a} + c\right) - d$$

Herein, $\alpha$, $\beta$ are gain and have value between, e.g., about 0 and 1, $\phi_{f1}$ and $\phi_{f2}$ are first and second characteristic values and are related to the flux, $\theta 1$ is a minimum conversion amount, $\theta 2$ is a required conversion amount, and a, b, c, and d are constant. In addition, $\alpha$, $\beta$, a, b, c, and d can be tuned through experiments.

Figure 6:
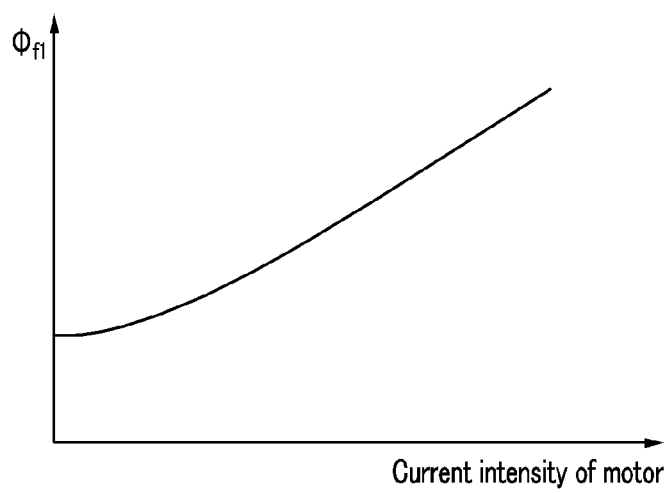
FIG. 6 is graph showing a first characteristic value according to current intensity of a motor.
Figure 7:
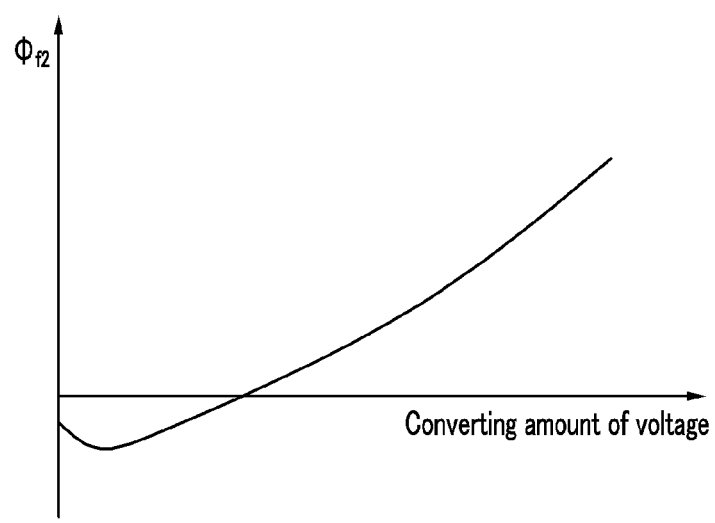
FIG. 7 is graph showing a second characteristic value according to converting amount of voltage.

The first characteristic value is varied according to the d-axis current and the q-current. In FIG. 6, the first characteristic value according to the current intensity of the motor is illustrated. The second characteristic value is varied according to voltage-converting characteristics. In FIG. 7, the second characteristic value according to the voltage-converting characteristics is illustrated.

Furthermore, the present invention may be embodied as computer readable media on a computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

A minimum conversion amount is a minimum voltage that should be converted by the converter and is predetermined in consideration of a voltage-converting efficiency of the converter, and a required conversion amount is the conversion amount of voltage that was required at a previous conversion of voltage. If the minimum heat-generation conversion amount of voltage is calculated, the controller 60 limits the required conversion amount of voltage based on the current voltage charged at the power source 10 at the step S130, and performs the conversion of the voltage at the step S140.

As described above, since energy that is lost to heat is minimized in a vehicle driven by limited energy, cooling cost of a motor-inverter system as well as wasted energy may be minimized according to an exemplary embodiment of the present invention.

In addition, minimization of wasted energy and cooling cost cause the vehicle to conserve driving energy, and thereby fuel economy may be enhanced. Therefore, environmentally-friendly aspect of the vehicle may be maximized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A system for controlling a motor of a vehicle, comprising:

a power source configured to supply direct current (DC) electricity;

a converter configured to selectively receive and convert the DC electricity of the power source into inverter input voltage;

a relay module configured to selectively connect the power source to the converter;

an inverter module configured to receive the inverter input voltage from the converter, convert the inverter input voltage into 3-phase AC current, and supply the 3-phase AC current to the motor; and a controller configured to control operations of the converter, the relay module, and the inverter module, wherein the controller performs a minimum heat-generation control to minimize the inverter input voltage that is a sum of heat generated due to a flux-weakening control and heat generated due to suppression of the flux-weakening control by the converter, the minimized inverter input voltage input to the inverter module.

2. The system of claim 1, wherein the inverter input voltage is calculated from a first characteristic value relating to currents of the first and second axes and a second characteristic value relating to voltage-converting characteristics of the converter.

3. The system of claim 1, wherein the minimum heat-generation control is performed by the controller unless a maximum voltage or a minimum voltage is to be secured, the motor is controlled to be operated with a maximum torque, or a state of charge (SOC) needs to be conserved.

4. A system for controlling a motor of a vehicle comprising a converter configured to convert direct current (DC) electricity of a power source into inverter input voltage, an inverter module configured to convert the inverter input voltage of the converter into 3-phase alternating current (AC) current and supply the AC current to the motor, and a controller configured to control operations of the converter and the inverter module, wherein the controller performs flux-weakening control where flux having a direction opposite to a direction of flux generated by the motor is generated, and suppresses the flux-weakening control so as to reduce heat generated by the flux-weakening control, and wherein the controller performs a minimum heat-generation control to minimize the inverter input voltage that is a sum of heat generated due to the flux-weakening control and heat generated due to suppression of the flux-weakening control, the minimized inverter input voltage input to the inverter module.

5. The system of claim 4, wherein the inverter input voltage is calculated from a first characteristic value relating to currents of the first and second axes and a second characteristic value relating to voltage-converting characteristics of the converter.

6. The system of claim 4, wherein the minimum heat-generation control is performed by the controller unless a maximum voltage or a minimum voltage is to be secured, the motor is controlled to be operated with a maximum torque, or a state of charge (SOC) is to be secured.

7. A non-transitory computer readable medium containing executable program instructions executed by a controller, comprising:

program instructions that convert direct current (DC) electricity of a power source into inverter input voltage;

program instructions that convert the inverter input voltage of the converter into 3-phase alternating current (AC) current and supply the AC current to the motor;

program instructions that control operations of the converter and the inverter module;

program instructions that perform a minimum heat-generation control to minimize the inverter input voltage that is a sum of heat generated due to the flux-weakening control and heat generated due to suppression of the flux-weakening control; and program instruction that input the minimized inverter input voltage into the inverter module.

8. The non-transitory computer readable medium of claim 7, further comprising program instructions that calculate the inverter input voltage from a first characteristic value relating to currents of the first and second axes and a second characteristic value relating to voltage-converting characteristics of the converter.

9. The non-transitory computer readable medium of claim 7, wherein the minimum heat-generation control is performed by the controller unless a maximum voltage or a minimum voltage is to be secured, the motor is controlled to be operated with a maximum torque, or a state of charge (SOC) is to be secured.

10. A method for controlling a motor of a vehicle, comprising:

converting, by a converter, direct current (DC) electricity of a power source into inverter input voltage;

converting, by an inverter module, the inverter input voltage of the converter into 3-phase alternating current (AC) current and supply the AC current to the motor;

performing, by a controller, a minimum heat-generation control to minimize the inverter input voltage that is a sum of heat generated due to the flux-weakening control and heat generated due to suppression of the flux-weakening control; and inputting, by the controller, the minimized inverter input voltage into the inverter module.

11. The method of claim 10, further comprising calculating the inverter input voltage from a first characteristic value relating to currents of the first and second axes and a second characteristic value relating to voltage-converting characteristics of the converter.

12. The method of claim 10, wherein the minimum heat-generation control is performed by the controller unless a maximum voltage or a minimum voltage is to be secured, the motor is controlled to be operated with a maximum torque, or a state of charge (SOC) is to be secured.

* * * * *